United States Patent
Song

(10) Patent No.: US 8,964,526 B2
(45) Date of Patent: Feb. 24, 2015

(54) METHOD AND DEVICE FOR CLASSIFYING MEDIA ACCESS CONTROL ADDRESS BASED ON ETHERNET RING NETWORK

(75) Inventor: Xiaoli Song, Shenzhen (CN)

(73) Assignee: ZTE Corporation (CN)

(*) Notice: Subject to any disclaimer, the term of this patent is extended or adjusted under 35 U.S.C. 154(b) by 385 days.

(21) Appl. No.: 13/265,058

(22) PCT Filed: Sep. 4, 2009

(86) PCT No.: PCT/CN2009/073760
§ 371 (c)(1),
(2), (4) Date: Oct. 18, 2011

(87) PCT Pub. No.: WO2010/102478
PCT Pub. Date: Sep. 16, 2010

(65) Prior Publication Data
US 2012/0092983 A1    Apr. 19, 2012

(30) Foreign Application Priority Data
Mar. 13, 2009   (CN) .......................... 2009 1 0079943

(51) Int. Cl.
*H04J 1/16* (2006.01)
*H04L 12/437* (2006.01)
*H04L 12/46* (2006.01)

(52) U.S. Cl.
CPC ............ *H04L 12/437* (2013.01); *H04L 12/462* (2013.01)
USPC ........... 370/217; 370/222; 370/242; 370/258; 370/392; 370/403; 370/424

(58) Field of Classification Search
None
See application file for complete search history.

(56) References Cited

U.S. PATENT DOCUMENTS 8,305,938 B2 * 11/2012 Holness et al. ............... 370/256
2007/0140248 A1   6/2007 Guo et al.
(Continued)

FOREIGN PATENT DOCUMENTS

CN   1756221 A   4/2006
CN   101217443 A   7/2008
(Continued)

OTHER PUBLICATIONS

International Search Report for PCT/CN2009/073760 English translation attached to original, Both completed by the Chinese Patent Office on Nov. 12, 2009, All together 4 Pages.
Korean Office Action Dated Apr. Apr. 21, 2013, Application No. 10-2011-7024121, 3 Pages.

*Primary Examiner* — Willie J Daniel, Jr.
(74) *Attorney, Agent, or Firm* — Brooks Kushman P.C.

(57) ABSTRACT

The present invention provides a method for classifying media access control (MAC) address based on an Ethernet ring network, and the method comprises: when the Ethernet ring network is carrying out initialization, a node of the ring classifies the MAC address corresponding to a non-ring port in its own forward database (FDB) into a MAC address group, and takes its own MAC address as the index of the MAC address group. A node of the ring broadcasts a message carrying the MAC address group indexed by its own MAC address in the Ethernet ring network; the node of the ring receiving the message completes the classification of the MAC address corresponding to the ring port in its own FDB by adding the MAC address group carried by the message into its own FDB. The present invention also provides a device for classifying media access control (MAC) address based on Ethernet ring network. With the method and device of the present invention, the MAC address refreshing time of a node of the ring is shortened, and the convergence speed of protection switching is improved.

14 Claims, 3 Drawing Sheets

(56) References Cited

U.S. PATENT DOCUMENTS

| | | |
|---|---|---|
| 2008/0002703 A1 | 1/2008 | Tripathi et al. |
| 2008/0107125 A1 | 5/2008 | Bruckman |
| 2008/0205418 A1 | 8/2008 | Rose et al. |
| 2008/0317030 A1* | 12/2008 | Rhee et al. .................... 370/392 |
| 2009/0268746 A1* | 10/2009 | Ogasahara et al. ........... 370/406 |
| 2010/0110881 A1 | 5/2010 | Ryoo et al. |

FOREIGN PATENT DOCUMENTS

| | | |
|---|---|---|
| JP | 2007049495 A | 2/2007 |
| KR | 20080089285 A | 10/2008 |
| KR | 20080112897 A | 12/2008 |

* cited by examiner

METHOD AND DEVICE FOR CLASSIFYING MEDIA ACCESS CONTROL ADDRESS BASED ON ETHERNET RING NETWORK

CROSS-REFERENCE TO RELATED APPLICATION

This application is the U.S. national phase of PCT Appln. No. PCT/CN2009/073760 filed Sep. 4, 2009 which claims priority to Chinese application 200910079943.7 filed Mar. 13, 2009, now issued as Chinese Patent No. 101834772 granted Jun. 11, 2013, the disclosures of which are incorporated in their entirety by reference herein.

TECHNICAL FIELD

This invention relates to Ethernet ring network protection technology, and more especially, to a method and device for classifying media access control (MAC) address based on the Ethernet ring network.

BACKGROUND OF THE RELATED ART

To date, metropolitan networks and enterprise networks widely use the Ethernet ring structure to improve the reliability of the network, when a certain link on the ring is disconnected, it might recover the communication between nodes in ring network by immediately activating a backup link.

FIG. 1 shows a topology diagram of communication path when the link in an Ethernet ring network is intact, and as shown in FIG. 1, the Ethernet ring network consists of five nodes—A, B, C, D, and E—and five segmental links <A, B>, <B, C>, <C, D>, <D, E>, and <E, A>. Take the node A as a control node or master node, and the link <A, B> connecting with node A is a ring protection link (RPL). When the links on the ring are intact, the node A blocks its corresponding RPL <A, B> port, that is, port a1, to prevent the generation of a ring. Flow between user 1 and user 2 is transmitted via the nodes A, E and D and the communication path formed by the links between these nodes.

When a certain node or link fails, the control node opens its corresponding RPL port so that the port can be used to forward data, thus guarantee the service connectivity. As shown in FIG. 2, when the link <D, E> detects a fault, the nodes D and E immediately block the failed ports d1 and e2, and the non-faulted ports, that is, d2 and e1, periodically send the corresponding protocol message to notify other nodes of the ring about the condition of this fault. After the control node A receives the protocol message, it starts up its own protection mechanism, opens the corresponding RPL port, and switches the traffic to the protection link, then the flow between the user 1 and the user 2 can be transmitted via the nodes A, B, C, D and the communication path formed by the links between these nodes. In order to achieve fast protection switching, after the other port nodes on the ring receive a protocol message related to fault, they refresh the MAC address.

There is a relatively accurate refreshing method in the existing MAC address refreshing mechanism: when an adjacent node of the failed link detects the link failure, it creates a delete address list (DAL) according to the port connecting to the failed link, that is, the failure port ID information, and clears the corresponding MAC address in its own forward database (FDB) according to the DAL, and then broadcasts or multicasts the protocol message carrying this DAL on the ring via the non-faulted port. After another of the nodes of the ring receives the protocol message carrying the DAL, it searches for the MAC addresses corresponding to the ports receiving the protocol message from its own FDB, matches the MAC addresses with the MAC addresses in the DAL, and if the match is successful, deletes the successfully-matched MAC address from the FDB.

The advantage of this MAC address refreshing approach is that it is relatively accurate, but there are two major drawbacks:

1, The DAL created by the adjacent node of the failed link contains all the MAC addresses corresponding to the fault port in the FDB of this node, if the faulted port has so many corresponding MAC addresses in the FDB that it exceeds the bearing capability of a protocol message frame, the protocol message needs to segment the DAL to carry;

2, after each node of the ring receives the protocol message, it needs to extract the DAL from the protocol message and matches the DAL with the MAC addresses corresponding to the port receiving the protocol message in its own FDB, and if the DAL carries a large number of MAC addresses, the matching time will be very long, which will result in a low MAC address refreshing rate of each node of the ring, thus significantly affect the convergence speed of the Ethernet ring network protection switching.

SUMMARY OF THE INVENTION

In view of this, the main purpose of the present invention is to provide a method and device for classifying MAC addresses based on an Ethernet ring network to reduce MAC address refreshing time of the nodes of the ring and improve the convergence speed of protection switching.

In order to achieve the abovementioned purpose, the technical scheme of the present invention is implemented as this:

The present invention provides a method for classifying MAC addresses based on an Ethernet ring. When the Ethernet ring network is carrying out initialization, the method comprises:

a node of the ring that classifies the MAC addresses corresponding to its non-ring port in an own FDB into one MAC address group and takes its own MAC address as an index of this MAC address group;

the node of the ring broadcasts a message carrying the MAC address group that takes its own MAC address as the index in the Ethernet ring network;

the node receiving the message on the ring completes the classification of the MAC addresses corresponding to the ring port in the own FDB by adding the MAC address group carried in the message to its own FDB.

Wherein, the message carrying the MAC address group that takes its own MAC address as the index applies the data frame format based on the standard Ethernet or the protocol message type reserved in the current Ethernet ring network protocol.

When the Ethernet ring network works properly, the method also comprises: a note of the ring that generates a MAC address classification message according to the MAC addresses in its own FDB and broadcasts the message in the Ethernet ring network; the node of the ring receiving the MAC address classification message classifies the MAC addresses carried in the MAC address classification message in its own FDB.

Wherein, the MAC address classification message comprises a periodic message and an instant message.

The periodic message is generated when the preset sending period arrives and is broadcasted in Ethernet ring network; said instant message is generated when adding the MAC addresses and is broadcasted in the Ethernet ring network.

Wherein, the node of the ring classifies the MAC addresses carried in the MAC address classification message in the own FDB, and it specifically comprises that:

when the MAC address classification message is a periodic message, the node of the ring searches for the corresponding MAC address group in its own FDB according to the index of the MAC address group carried in said periodic message, and uses all MAC addresses carried in the periodic message to replace the MAC addresses in the searched-out MAC address group;

when the MAC address classification message is an instant message, the node of the ring searches for the corresponding MAC address group in its own FDB according to the index of the MAC address group carried in said instant message, and adds the MAC addresses carried in the instant message to the searched-out MAC address group.

The present invention also provides a device for classifying MAC addresses based on an Ethernet ring network, characterized in that, the device comprises:

a first address classification module, used to classify the MAC addresses corresponding to the non-ring port of the node of the ring in an own FDB into one MAC address group when the Ethernet ring network is carrying out initialization, and takes the MAC address of the node of ring own as an index of the MAC address group;

a message generation module, used to generate a message carrying the MAC address group that takes the MAC address of the current node of the ring own as the index and broadcast the message in the Ethernet ring network;

a second address classification module, used to receive the message generated by the message generation module, and complete the classification of the MAC addresses corresponding to the ring port in the FDB by adding the MAC address group carried in the message to the FDB of the current node of the ring.

Wherein, the message generation module is also used to generate a MAC address classification message according to the MAC address in the FDB of the current node of the ring when the Ethernet ring network works properly, and broadcast the message in the Ethernet ring network, and wherein said second address classification module is also used to receive the MAC address classification message and classify the MAC addresses carried in the MAC address classification message in the FDB of the current ring node.

Accordingly, said second address classification module is also used to find out the corresponding MAC address group in the FDB according to the index of the MAC address group carried in the periodic message when the MAC address classification message is a periodic message, and to use all MAC addresses carried in the periodic message to replace the MAC addresses in the found-out MAC address group;

it is also used to find out the corresponding MAC address group in the FDB according to the index of the MAC address group carried in the instant message when the MAC address classification message is an instant message, and to add the MAC addresses carried in the instant message to the found-out MAC address group.

In the method for classifying MAC addresses in accordance with the present invention, firstly classify the MAC addresses in the own FDB of each node on the ring, and when refreshing the MAC addresses based on the MAC address classification, the node of the ring can rapidly find out the MAC address group in which the MAC address that needs to be refreshed is located from its own FDB according to the MAC address refreshing message in the Ethernet ring network, thus reduce the time for matching the MAC address that needs to be updated with the MAC address in its own FDB, and reduce the MAC address refreshing time of the node of the ring and improve the convergence speed of the protection switching in the Ethernet ring network.

In addition, the present invention divides the MAC address refreshing message into the periodic message and instant message, wherein, the instant message is only used to describe the MAC address information that changes, especially the added MAC address information which carries relatively small amount of data, while the periodic message is sent with a relatively long sending period, thus significantly reducing the burden of the network.

PREFERRED EMBODIMENTS OF THE PRESENT INVENTION

The technical scheme of the present invention will be illustrated in further detail in the following in combination with the accompanying figures and specific examples.

Based on the MAC address refreshing method in the Ethernet ring network, the present invention instantly classifies MAC addresses when a node of the ring learns the MAC addresses at the stage of initialization of the Ethernet ring network. When the nod of the ring learns the MAC addresses via a non-ring port, it immediately classifies the MAC addresses, and classifies the MAC addresses into the MAC address group that takes the node's own MAC address as an index, and then encapsulates the MAC address group into a message and broadcasts the message via the port on the ring, so that the node of the ring that receives the message can learn the MAC address corresponding to the port on the ring via the message.

Figure 1:
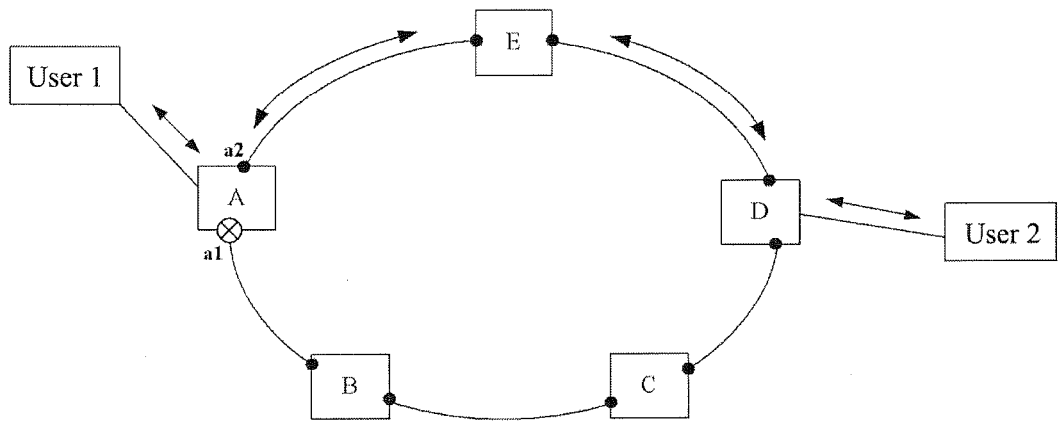
FIG. 1 is a schematic diagram of the networking structure when the link in the Ethernet ring network is normal in the related art.
Figure 2:
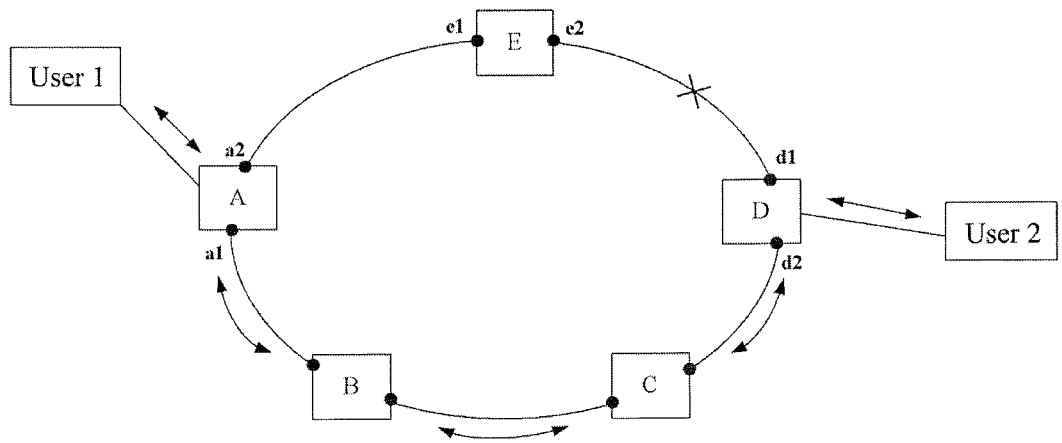
FIG. 2 is a schematic diagram of the networking structure when the protection switching happens in the Ethernet ring network in the related art.
Figure 3:
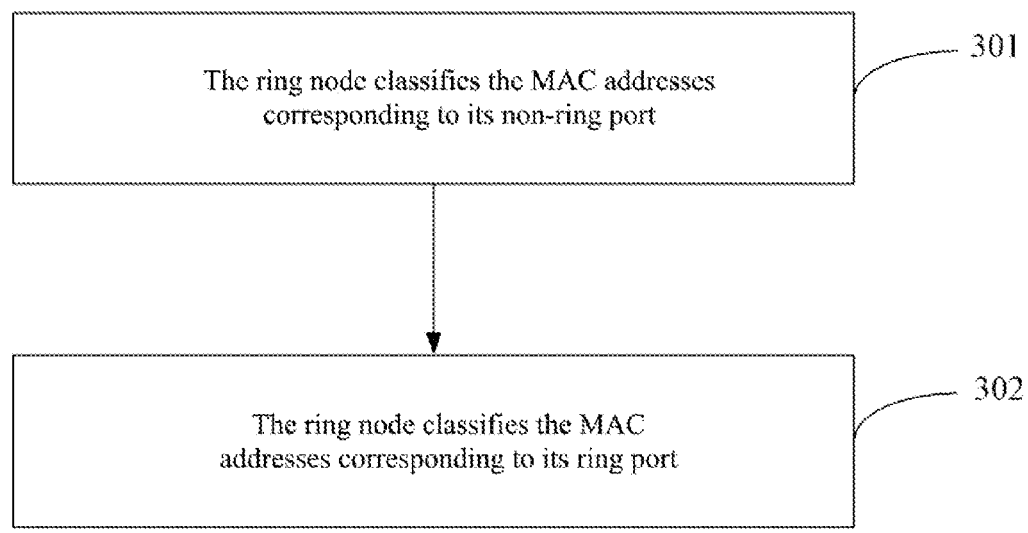
FIG. 3 is a flow chart of the method for classifying the MAC addresses in accordance with the present invention.

In the present invention, the flow chart of each node on the ring classifying the MAC addresses in its own FDB when the Ethernet ring network carrying out initialization is shown in FIG. 3, and the procedure comprises:

At step 301, the node of the ring classifies the MAC addresses corresponding to the non-ring node.

Before classifying the MAC addresses, it needs to initialize the Ethernet ring network. When the Ethernet ring network is carrying out initialization, after the node of the ring learns the MAC addresses via the non-ring port, the node immediately classifies these MAC addresses, and the specific method is: the node of the ring classifies the MAC address corresponding to the non-ring port into one MAC address group, and takes its own MAC address as the index of the MAC address group. The MAC addresses learned via the non-ring port are called as user MAC addresses of the node of the ring, and the member MAC address in this MAC address group comprises an index and a user MAC address.

Preferably, the MAC address group can be divided into three parts: a ring node MAC address, a user MAC address and a port number, wherein the ring node MAC address is used to store the index of the MAC address group; the user MAC address is used to store the user MAC address of the MAC address group; the port number is used to store the port number of the node of the ring corresponding to each user MAC address in the MAC address group. Of course, according to the composition of the MAC address group, there also might be other configuration methods, as long as these methods can indicate the relationship between the index of the MAC address group, the user MAC address and the port number.

Figure 4:
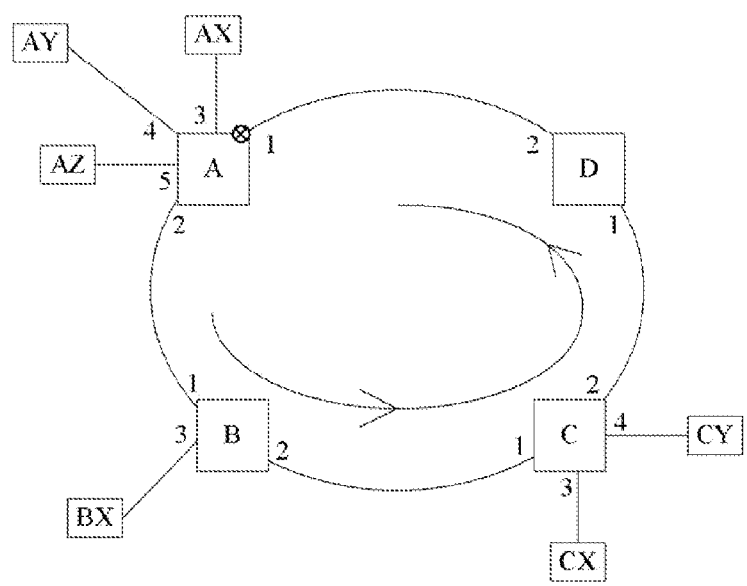
FIG. 4 is a schematic diagram of the topology structure of the Ethernet ring network in the present invention.

In FIG. 4, the ports 3, 4 and 5 of the node A are non-ring ports, and the corresponding MAC addresses are respectively AX, AY and AZ. The Node A classifies the MAC addresses AX, AY and AZ into one MAC address group, and takes its own MAC address, that is A, as the index of the MAC address group. Table 1 shows the FDB after each node of the ring classifies the MAC addresses corresponding to its non-ring ports in FIG. 4.

TABLE 1

| Ring node MAC address | User MAC address | Port number | Ring node MAC address | User MAC address | Port number |
|---|---|---|---|---|---|
| FDB of the node A | | | FDB of the node B | | |
| A | AX | 3 | B | BX | 3 |
|  | AY | 4 |  |  |  |
|  | AZ | 5 |  |  |  |
| FDB of the node C | | | FDB of the node D | | |
| C | CX | 3 |  |  |  |
|  | CY | 4 |  |  |  |

For node D, from FIG. 4 it can be seen that the non-ring port of the node D does not have the corresponding MAC addresses; therefore, the FDB of the node D in Table 1 does not contain the MAC address group that takes the MAC address of the node D as the index.

At step 302: the node of the ring classifies the MAC addresses corresponding to its ring port.

After the node of the ring classifies the MAC addresses corresponding to its own non-ring port, it immediately broadcasts the MAC address group on the ring, so that other nodes of the ring can learn. Preferably, the node of the ring encapsulates the MAC address group that takes its own MAC address as the index into one message, and the message is called a special message, and broadcasts the special message on the ring for the first time via the ring ports.

The special message can use the data frame format based on the standard Ethernet network or the protocol message type reserved in the current Ethernet ring network protocol. For example, the node A (in table 1) encapsulates the MAC address group that takes its own MAC address as the index into the special message, and the special message uses the data frame format based on the standard Ethernet, and the encapsulated special message is shown in Table 2:

TABLE 2

| DA | SA | MAC GROUP |
|---|---|---|
| M | A | A, AX, AY, AZ |

The DA field: indicating the destination node MAC address of the message, M denotes broadcasting, that is, the destination node of the message is all other nodes but this node. SA field: indicating the source node MAC address of the message or the index of the MAC address group carried in the message. MAC GROUP field: used to carry the member MAC addresses including the index and the user MAC address in the MAC address group.

The node of the ring broadcasts the special message carrying the MAC address group that takes its own MAC address as the index in the Ethernet for the first time via its ring ports, and each node of the ring can complete its own FDB. Meanwhile, each node of the ring can classify the MAC addresses corresponding to its own ring ports. Since the network topology structure of the Ethernet is relatively fixed at the stage of the Ethernet ring network carrying out initialization, with the first broadcast of the special message, the node of the ring adds the MAC address group carried in the received special message to its own FDB, thus to add the MAC addresses corresponding to its ring ports in the FDB, meanwhile, to classify these MAC addresses.

Preferably, the node of the ring receiving the special message can directly adds the MAC address group carried by the special message to its own FDB, classify all member MAC address of the MAC address group, such as the information carried in the MAC GROUP, into one MAC address group, and work as the user MAC address of the MAC address group, take the source ring node MAC address of the special message, such as the information carried in the SA field, as the index of the MAC address group, and take the port number on the ring receiving the special message as the port number corresponding to all user MAC addresses in the MAC address group.

After sending the special message for the first time, the FDB of each node of the ring shown in FIG. 4 is shown in Table 3:

TABLE 3

| Ring node MAC address | User MAC address | Port number | Ring node MAC address | User MAC address | Port number |
|---|---|---|---|---|---|
| FDB of the node A | | | FDB of the node B | | |
| A | AX | 3 | B | BX | 3 |
|  | AY | 4 | A | A | 1 |
|  | AZ | 5 |  | AX | 1 |
| B | B | 2 |  | AY | 1 |
|  | BX | 2 |  | AZ | 1 |
| C | C | 2 | C | C | 2 |
|  | CX | 2 |  | CX | 2 |
|  | CY | 2 |  | CY | 2 |
| D | D | 2 | D | D | 2 |
| FDB of the node C | | | FDB of the node D | | |
| C | CX | 3 | A | A | 1 |
|  | CY | 4 |  | AX | 1 |
| A | A | 1 |  | AY | 1 |
|  | AX | 1 |  | AZ | 1 |
|  | AY | 1 | B | B | 1 |
|  | AZ | 1 |  | BX | 1 |
| B | B | 2 | C | C | 1 |
|  | BX | 2 |  | CX | 1 |
| D | D | 2 |  | CY | 1 |

Therefore, the MAC address information of the FDB of each node of the ring is relatively complete. When the Ethernet ring network works normally, its network topology structure does not change significantly, and the number of the changed MAC addresses is relatively small. At this time, other methods can be used to classify the changed MAC addresses, and the following examples are used for illustration.

Figure 5:
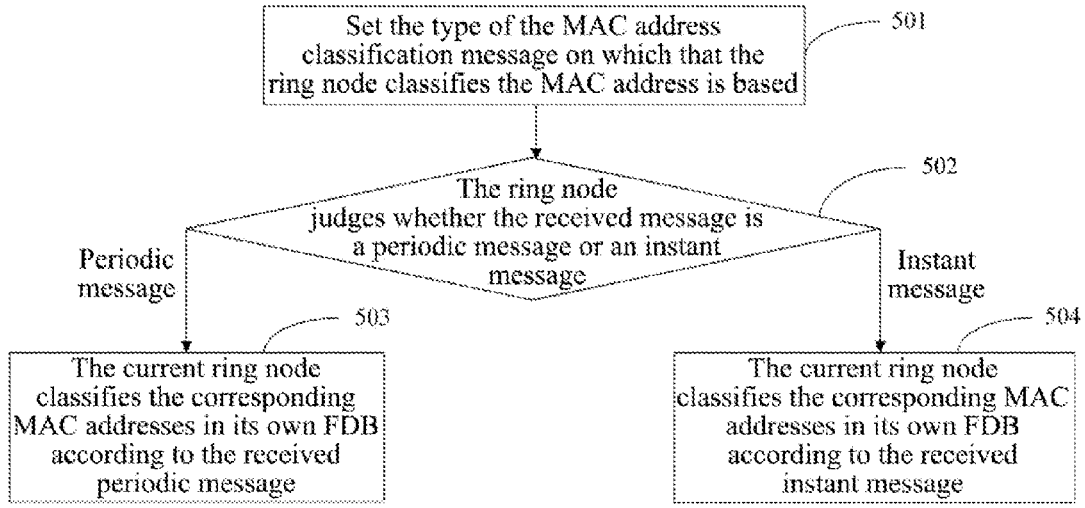
FIG. 5 is a flow chart of the method for refreshing the MAC addresses in accordance with the present invention.

When the Ethernet ring network works normally, the procedure of the node of the ring classifying the MAC addresses in its own FDB is shown in FIG. 5, and the procedure comprises:

At step 501, setting the type of the MAC address classification message on which that the node of the ring classifies the MAC addresses is based.

Preferably, there are two types of MAC address classification messages: an instant message and a periodic message, wherein, the instant message is used to describe the MAC address information that changes. Since the number of MAC addresses that change is relatively small when the Ethernet ring network works normally, the number of MAC addresses that change and are carried in the instant message is relatively small, so is the corresponding data amount. Preferably, the instant message in the present invention is used to describe the added MAC address information.

When the Ethernet ring network works normally, its network topology structure will change, so as the MAC address corresponding to a certain port of a certain corresponding node of the ring, especially the newly added MAC addresses, and at this time, in the FDB of this node of the ring, the corresponding user MAC address is added to the MAC address group that takes the MAC address of this node own as the index. Based on the current FDB, the node of the ring immediately generates an instant message to describe the added user MAC address in the MAC address group that takes the MAC address of this node own as the index.

Take the topology structure of the Ethernet ring network shown in FIG. 4 for example, and suppose one MAC address AN is added to the port 3 of the node A, in the FDB of the node A, the user MAC address of the MAC address group that takes the MAC address A as the index changes, that is, one new user MAC address AN is added to the corresponding port 3. Right now, the node A generates an instant message to describe that one user MAC address AN is added to the MAC address group that takes the node A as the index.

The instant message also can use the data frame format based on the standard Ethernet or the protocol message type reserved in the current Ethernet ring network protocol. Preferably, the format of the instant message is the same as the format of the special message. The instant message shown in Table 4 is:

TABLE 4

| DA | SA | MAC ADD |
|----|----|---------|
| M  | A  | AN      |

Wherein, the MAC ADD field indicates the user MAC address that needs to be added. The SA field indicates not only the source node of the message in the instant message, but also the index of the MAC address group to which the newly added MAC address belongs.

The periodic message is: when the special message is broadcasted on the ring for the first time, the system sets the sending period of the special message for each node of the ring, and the special message is periodically broadcasted on the ring with this sending period when the Ethernet ring network works normally, and the special message is called a periodic message when the Ethernet ring network works normally. The sending period can be set as desired, and the sending period of the periodic message is relatively long in the practical application. Preferably, the sending period might be set as 24 hours. Although the data amount carried in the periodic message is relatively large, its sending period is relatively long. Thus, the burden of the network is largely reduced.

When it needs to send the periodic message, the node of the ring generates a periodic message according to the condition of the MAC addresses in the current FDB. After the Ethernet ring network works for a relatively long time, since some factors might make the FDB of the node of the ring carry invalid MAC addresses or miss some of the newly added MAC addresses. Thus, the timing transmission of the periodic message can make the node of the ring delete the invalid MAC addresses or add the missing newly added MAC address, to thereby guarantee the validity and integrity of the MAC addresses in the FDB of the node of the ring.

The periodic message and instant message can be identified by message length and so on, preferably, a special field can be set in the periodic message and the instant message, and this field is set as desired, as long as it can uniquely identify the periodic message or the instant message.

At step 502, the node of the ring judges whether the received message is a periodic message or an instant message, and if it is a periodic message, proceed to step 503. If it is an instant message, proceed to step 504.

The message type can be judged according to the periodic message and instant message identification method in step 501, and the process is not repeated here.

At step 503, the current node of the ring classifies the corresponding MAC addresses in its own FDB according to the received periodic message, and the current process ends.

If the current node receives a periodic message, according to the index, such as the value of the SA field, of the MAC address group in the periodic message, the current node carries out matching in its own FDB and finds out the corresponding MAC address group; and then, use all member MAC addresses, such as the value carried in the MAC GROUP field, of the MAC address group carried in the periodic message to replace the all user MAC addresses of the MAC address group searched out by the current node of the ring from its own FDB. Therefore, the current node of the ring can add the missing newly added MAC address to the corresponding MAC address group, or delete the invalid MAC addresses in the corresponding MAC address group.

It can be seen that, the current node of the ring searches its own FDB according to the index of the MAC address group carried in the periodic message and rapidly searches out the corresponding MAC address group in its own FDB.

Take the topology structure of the Ethernet ring network shown in FIG. 4 and the FDB of each node of the ring in Table 3 for example, and suppose the periodic message received by the node B is shown in Table 5:

TABLE 5

| DA | SA | MAC GROUP |
|----|----|-----------|
| M  | A  | A, AX, AN, AY, AZ |

By analyzing the periodic message, the node B knows that the index of the MAC address group is A. Node B then searches out the MAC address group that takes A as the index in its own FDB; and then use all member MAC addresses carried in the MAC GROUP field in the periodic message to replace all user MAC addresses in the MAC address group that takes A as the index in its own FDB, to acquire the current FDB of the node B shown in Table 6:

TABLE 6

| FDB of the node B | | |
| --- | --- | --- |
| Ring node MAC address | User MAC address | Port number |
| B | BX | 3 |
| A | A | 1 |
|   | AX | 1 |
|   | AN | 1 |
|   | AY | 1 |
|   | AZ | 1 |
| C | C | 2 |
|   | CX | 2 |
|   | CY | 2 |
| D | D | 2 |

At step 504, the current node of the ring classifies the corresponding MAC addresses in its own FDB according to the received instant message.

As the instant message in the present invention is used to describe the added MAC address information, the node of the ring receiving the instant message needs to add the newly added MAC addresses to the corresponding MAC address group, that is, classify the newly added MAC addresses.

By analyzing the instant message, it can acquire the index, such as the value of the SA field, of the MAC address group to which the MAC addresses to be classified belong. After the current node of the ring finds out the corresponding MAC address group in its own FDB via the index, it adds the newly added MAC address carried in the instant message to the corresponding MAC address group.

Take the topology structure of the Ethernet ring network shown in FIG. 4 and the FDB of each node of the ring in Table 3 for example, and suppose the instant message received by the node B is shown in Table 8:

TABLE 7

| DA | SA | MAC GROUP |
| --- | --- | --- |
| M | A | AN |

By analyzing the instant message, it knows that the index of the MAC address group to which the MAC address to be classified belongs is A, and the MAC address to be classified is AN. After the node B adds the newly added MAC address AN to the corresponding MAC address group in its own FDB according to the instant message, the FDB of the node B is shown in Table 8:

TABLE 8

| FDB of the node B | | |
| --- | --- | --- |
| Ring node MAC address | User MAC address | Port number |
| B | BX | 3 |
| A | A | 1 |
|   | AX | 1 |
|   | AN | 1 |
|   | AY | 1 |
|   | AZ | 1 |
| C | C | 2 |
|   | CX | 2 |
|   | CY | 2 |
| D | D | 2 |

It should be noted that, with the description of steps 503 and 504, it can be seen that in the condition that the Ethernet ring network works normally, when each node of the ring classifies the MAC addresses according to the received MAC address classification message, the port number corresponding to the MAC address carried in the MAC address classification message in the FDB is the port number of the port form which the node of the ring receives the MAC address classification message.

When the Ethernet ring network performs protection switching, the node of the ring refreshes the MAC addresses according to the protection protocol of the Ethernet ring network, mainly clearing the corresponding MAC address in its ownFDB. Meanwhile, each node relearns the new MAC address, and then the node of the ring generates an instant message according to the re-learned MAC address and broadcasts the message. Therefore, after other nodes of the ring receive the broadcasted instant message, they will complete their own FDBs, and classify all MAC addresses in their own FDBs at the same time.

From the MAC address refreshing method of the present invention, it can be seen that the timing broadcast of the periodic message can sustain the validity of the MAC addresses in the FEB. The instant message can instantly reflect the changed MAC address information, and dynamically and instantly maintain the MAC addresses in the FDB. In addition, the data amount carried in the instant message is relatively small, almost occupying no network bandwidth.

Figure 6:
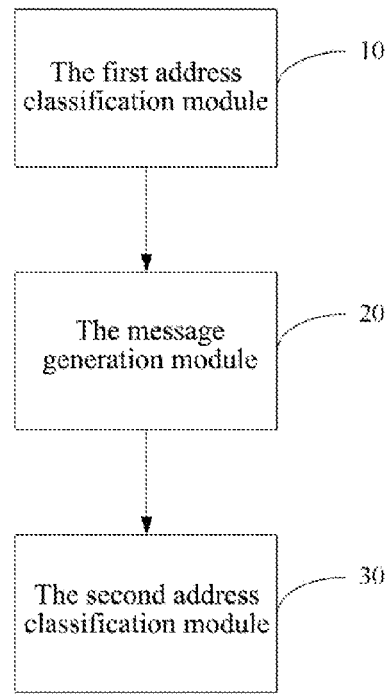
FIG. 6 is a schematic diagram of the structure relationship of the device for refreshing the MAC addresses based on the Ethernet ring network in accordance with the present invention.

In order to achieve the method for refreshing the MAC addresses based on the Ethernet ring network, the present invention also provides a device for refreshing MAC addresses based on an Ethernet ring network. As shown in FIG. 6, the device comprises: a first address classification module 10, a message generation module 20 and a second address classification module 30, wherein, the first address classification module 10 is used to classify the MAC addresses corresponding to the non-ring port of the node of the ring in its own FDB into one MAC address group when the Ethernet ring network is carrying out initialization, and takes the MAC address of the node of the ring as the index of the MAC address group;

the message generation module 20 is used to generate a message carrying the MAC address group that takes the MAC address of the current node of the ring as the index and broadcast the message in the Ethernet ring network;

the second address classification module 30 is used to receive the message generated by the message generation module 20, and complete the classification of the MAC addresses corresponding to the ring port in the FDB by adding the MAC address group carried in the message to the FDB of the current node of the ring.

The message generation module 20 is also used to generate a MAC address classification message according to the MAC addresses in the FDB of the current node of the ring, and broadcast the message in the Ethernet ring network.

The second address classification module 30 is also used to receive the MAC address classification message and classify the MAC addresses carried in the MAC address classification message in the FDB of the current node of the ring.

The MAC address classification message comprises a periodic message and an instant message, and correspondingly, the second address classification module 30 is also used to find out the corresponding MAC address group in the FDB according to the index of the MAC address group carried in the periodic message when the MAC address classification message is a periodic message, and to use all MAC addresses carried in the periodic message to replace the MAC addresses in the found-out MAC address group;

it is also used to find out the corresponding MAC address group in the FDB according to the index of the MAC address group carried in the instant message when the MAC address classification message is an instant message, and to add the MAC addresses carried in the instant message to the found-out MAC address group.

The above description includes only preferred examples of the present invention rather than the restriction of the protection scope of the present invention.

INDUSTRIAL APPLICABILITY

In the method for classifying the MAC addresses in accordance with the present invention, firstly classify the MAC addresses in the FDB of each node of the ring, and when classifying the MAC addresses based on the MAC address classification, the node of the ring can rapidly find out the MAC address group in which the MAC address that needs to be refreshed is located from its own FDB according to the MAC address refreshing message in the Ethernet ring network, thus reducing the time for matching the MAC address that needs to be updated with the MAC address in its own FDB, reducing the MAC address refreshing time of the node of the ring and improving the convergence speed of the protection switching in the Ethernet ring network.

In addition, the present invention divides the MAC address refreshing message into the periodic message and instant message, wherein, the instant message is only used to describe the MAC address information that changes, especially the added MAC address information which carries relatively small amount of data; while the periodic message is sent with a relatively long sending period, thus significantly reducing the burden of the network.

What is claimed is:

1. A method for classifying media access control (MAC) addresses based on an Ethernet ring network comprising:
when the Ethernet ring network is carrying out initialization
a first node of the ring classifying MAC addresses corresponding to non-ring ports into one MAC address group, storing the MAC address group in a forward database (FDB) of the first node of the ring, and taking the MAC address of the first node of the ring as an index of the MAC address group;
the first node of the ring broadcasting a message carrying the MAC address group that takes the MAC address of the first node of the ring as the index in the Ethernet ring network; and
a second node of the ring receiving the message completing classification of MAC addresses corresponding to ring ports in an FDB of the second node of the ring based on the index of the MAC address group by adding the MAC address group carried in the message to the FDB of the second node of ring;
said second node of the ring being any node of the ring other than the first node of the ring in the Ethernet ring network.

2. The method of claim 1 wherein the message carrying the MAC address group that takes the MAC address of the first node of the ring as the index uses a data frame format based on a standard Ethernet, or uses a protocol message type reserved in a current Ethernet ring network protocol.

3. The method of claim 2 further comprising:
when the Ethernet ring network works normally,
the first node of the ring generating a MAC address classification message according to the MAC addresses in the FDB of the first node of the ring and broadcasting the MAC address classification message in the Ethernet ring network; and
the second node of the ring receiving the MAC address classification message, classifying MAC addresses carried in the MAC address classification message in the FDB of the second node of the ring.

4. The method of claim 3 wherein the MAC address classification message comprises a periodic message and an instant message.

5. The method of claim 4 wherein the periodic message is generated when a preset sending period arrives and is broadcasted in the Ethernet ring network; said instant message is generated when adding the MAC addresses and is broadcasted in the Ethernet ring network.

6. The method of claim 5 wherein the step of the second node of the ring classifying the MAC addresses carried in the MAC address classification message in the FDB of the second node of the ring comprises:
when the MAC address classification message is a periodic message, according to an index of a MAC address group carried in said periodic message, the second node of the ring searching out a MAC address group corresponding to the MAC address group in the FDB of the second node of the ring, and using all MAC addresses the MAC address group carried in the periodic message to replace MAC addresses in the searched-out MAC address group; and
when the MAC address classification message is an instant message, according to an index of a MAC address group carried in said instant message, the second node of the ring searching out a MAC address group corresponding to the MAC address group in the FDB of the second ring node, and adding MAC addresses carried in the instant message to a searched-out MAC address group.

7. The method of claim 1 further comprising:
when the Ethernet ring network works normally,
the first node of the ring generating a MAC address classification message according to the MAC addresses in the FDB of the first node of the ring and broadcasting the MAC address classification message in the Ethernet ring network; and
the second node of the ring receiving the MAC address classification message, classifying MAC addresses carried in the MAC address classification message in the FDB of the second node of the ring.

8. The method of claim 7 wherein the MAC address classification message comprises a periodic message and an instant message.

9. The method of claim 8 wherein the periodic message is generated when a preset sending period arrives and is broadcasted in the Ethernet ring network, and said instant message is generated when adding the MAC addresses and is broadcasted in the Ethernet ring network.

10. The method of claim 9 wherein the step of the second node of the ring classifying the MAC addresses carried in the MAC address classification message in the FDB of the second node of the ring comprises:
when the MAC address classification message is a periodic message, according to an index of a MAC address group carried in said periodic message, the second node of the ring searching out a MAC address group corresponding to the MAC address group in the FDB of the second node of the ring, and using all MAC addresses the MAC address group carried in the periodic message to replace MAC addresses in the searched-out MAC address group; and when the MAC address classification message is an instant message, according to an index of a MAC address group carried in said instant message, the second node of the ring searching out a MAC address group corresponding to the MAC address group in the FDB of the second node of the ring, and adding MAC addresses carried in the instant message to a searched-out MAC address group.

11. A device for classifying media access control (MAC) addresses based on an Ethernet ring network, the device comprising:
a first address classification module, configured to classify MAC addresses corresponding to non-ring ports of a first node of the ring into one MAC address group and store the MAC address group in a forward database (FDB) of the first node of the ring when the Ethernet ring network is carrying out initialization, and to take the MAC address of the first node of the ring as an index of the MAC address group;
a message generation module, configured to generate a message carrying the MAC address group that takes the MAC address of the first node of the ring as the index and broadcast the message in the Ethernet ring network; and
a second address classification module, configured to receive the message generated by the message generation module, and to complete classification of MAC addresses corresponding to ring ports in an FDB of a second node of the ring based on the index of the MAC address group by adding the MAC address group carried in the message to the FDB of the second node of the ring;
wherein said second node of the ring is any ring node but the first node of the ring in the Ethernet ring network.

12. The device of claim 11 the message generation module is also configured to generate a MAC address classification message according to the MAC address in the FDB of the first node of the ring when the Ethernet ring network works normally, and broadcast the MAC address classification message in the Ethernet ring network;
said second address classification module is also configured to receive the MAC address classification message and classify MAC addresses carried in the MAC address classification message in the FDB of the second node of the ring.

13. The device of claim 12 wherein said second address classification module is also configured to: when the MAC address classification message is a periodic message, according to an index of a MAC address group carried in the periodic message, search out a MAC address group corresponding to the MAC address group in the FDB of the second node of the ring and use all MAC addresses carried in the periodic message to replace MAC addresses in the searched-out MAC address group; and when the MAC address classification message is an instant message, according to an index of a MAC address group carried in the instant message, search out a MAC address group corresponding to the MAC address group in the FDB of the second node of the ring and add MAC addresses carried in the instant message to the searched-out MAC address group.

14. The device of claim 11 wherein
said second address classification module is also configured to: when the MAC address classification message is a periodic message, according to an index of a MAC address group carried in the periodic message, search out a MAC address group corresponding to the MAC address group in the FDB of the second node of the ring and use all MAC addresses carried in the periodic message to replace MAC addresses in the searched-out MAC address group; and when the MAC address classification message is an instant message, according to an index of a MAC address group carried in the instant message, search out a MAC address group corresponding to the MAC address group in the FDB of the second node of the ring and add MAC addresses carried in the instant message to the searched-out MAC address group.

* * * * *